(12) United States Patent
Finnigan et al.

(10) Patent No.: US 8,996,549 B2
(45) Date of Patent: Mar. 31, 2015

(54) RECOMMENDING DATA BASED ON USER AND DATA ATTRIBUTES

(75) Inventors: James Finnigan, Redmond, WA (US); Hariharan Sivaramakrishnan, Bellevue, WA (US); Anthony Nino Bice, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 13/332,022

(22) Filed: Dec. 20, 2011

(65) Prior Publication Data

US 2013/0091164 A1    Apr. 11, 2013

Related U.S. Application Data

(60) Provisional application No. 61/545,991, filed on Oct. 11, 2011.

(51) Int. Cl.
*G06F 17/30* (2006.01)

(52) U.S. Cl.
CPC .............................. *G06F 17/30867* (2013.01)
USPC ......................................... 707/758; 707/769

(58) Field of Classification Search
CPC .................. G06F 17/30867; G06F 17/30864; G06F 17/30522
USPC ................................................ 707/769, 758
See application file for complete search history.

(56) References Cited

U.S. PATENT DOCUMENTS

| 7,644,361 | B2 | 1/2010 | Wu et al. |
| 7,822,619 | B2 | 10/2010 | Davidson |
| 7,836,110 | B1 | 11/2010 | Shchoenbach |
| 7,885,902 | B1 | 2/2011 | Shoemaker et al. |
| 7,895,221 | B2 * | 2/2011 | Colledge et al. ............. 707/758 |
| 7,895,595 | B2 | 2/2011 | Hammond et al. |

(Continued)

FOREIGN PATENT DOCUMENTS

WO    WO 2012051586 A1    4/2012

OTHER PUBLICATIONS

Hao, Ma, "Learning to Recommend", In Thesis Submitted in Partial Fulfilment of the Requirements for the Degree of Doctor of Philosophy in Computer Science and Engineering, The Chinese University of Hong Kong, Dec. 2009, 170 pages.

(Continued)

*Primary Examiner* — Noosha Arjomandi
(74) *Attorney, Agent, or Firm* — Kate Drakos; David Andrews; Micky Minhas

(57) ABSTRACT

The present invention extends to methods, systems, and computer program products for recommending data based on user and data attributes. User information and accessed data sets are periodically (and possibly automatically) accessed and updated. Source attributes are derived from user information and accessed data sets. Target attributes are derived from data directories and data services. Source attributes for an accessed data set are used along target attributes for a data directory or data service to determine the desirability of data directory or data service as a source of data relevant to the accessed data set. The data directory and/or data service can be recommended as able to provide relevant data. Accordingly, recommend relevant data can be recommended to a user without the user having to expressly search for the relevant data or even know that the relevant data exists.

22 Claims, 2 Drawing Sheets

(56) References Cited

U.S. PATENT DOCUMENTS

| | | |
|---|---|---|
| 2003/0177110 A1 | 9/2003 | Okamoto et al. |
| 2004/0083232 A1 | 4/2004 | Ronnewinkel et al. |
| 2004/0260534 A1 | 12/2004 | Pak |
| 2006/0095653 A1* | 5/2006 | Fleming et al. ............... 711/108 |
| 2007/0276845 A1* | 11/2007 | Geilich ......................... 707/100 |
| 2008/0134053 A1 | 6/2008 | Fischer |
| 2008/0195664 A1 | 8/2008 | Maharajh |
| 2008/0254432 A1 | 10/2008 | Woolf et al. |
| 2008/0270472 A1 | 10/2008 | Yonemoto |
| 2009/0276403 A1 | 11/2009 | Tamayo et al. |
| 2010/0017398 A1 | 1/2010 | Gupta et al. |
| 2010/0070448 A1 | 3/2010 | Omoigui |
| 2010/0169245 A1 | 7/2010 | Basel et al. |
| 2010/0287033 A1 | 11/2010 | Mathur |
| 2011/0010210 A1* | 1/2011 | Alcorn et al. ..................... 705/7 |
| 2011/0161323 A1 | 6/2011 | Hagiwara |
| 2011/0225107 A1* | 9/2011 | Khosravy ........................ 706/12 |
| 2011/0234613 A1 | 9/2011 | Hanson |
| 2011/0238525 A1* | 9/2011 | Linden et al. ................. 705/26.7 |

OTHER PUBLICATIONS

U.S. Appl. No. 13/331,991, filed Dec. 20, 2011, Bice.

"Just What Is an Intelligent Agent?", In Proceedings of Information Outlook, vol. 4, Issue 7, Jul. 2000.

Office Action dated Feb. 28, 2014 cited in U.S. Appl. No. 13/331,991.

* cited by examiner

RECOMMENDING DATA BASED ON USER AND DATA ATTRIBUTES

CROSS-REFERENCE TO RELATED APPLICATIONS

The present application claims the benefit of U.S. Provisional Patent Application Ser. No. 61/545,991, entitled "RECOMMENDING DATA BASED ON USER AND DAT", filed Oct. 11, 2011, which is incorporated by reference herein in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

When a user is working with a dataset, the user is typically required to go and find related data and/or data resources that might add value to the dataset. Finding data and/or data resources, is a typically manual and somewhat burdensome process for a user. Further, the user must know what data to search for and also know that they want to search for the data. That is, the user has to know the right question (or questions) to ask.

For example, when working with a dataset, a user typically leaves their data application (e.g., word processor, spreadsheet, database, etc.) and uses search tools (e.g., Web based search engines) to find related data and/or data resources they can bring into their dataset to add value. Using a search tool also typically requires the user to provide relevant input to the search tool to cause the search tool to look for related data and/or data resources. Further, search tools typically lack any information about the user (e.g., user context) that might be used to improve searches for relevant data and/or data resources.

BRIEF SUMMARY

The present invention extends to methods, systems, and computer program products for recommending data based on user and data attributes. It is detected that a user has accessed a dataset within a data processing application. Source attributes are derived for the accessed dataset. The source attributes are derived from one or more of: user information for the user and data information for the data.

Target attributes are identified for one or more sets of target data and/or one or more target data services. The derived source attributes are used along with identified target attributes for at least one of the sets of target data and/or at least one of the target data services to determine the desirability of the at least one of the sets of target data and/or at least one of the target data services as a source of relevant data. At least one set of target data and/or at least one target data service is recommended to the user as capable of providing relevant data. The relevant data having been found to be useful to other users working on data similar to the accessed dataset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
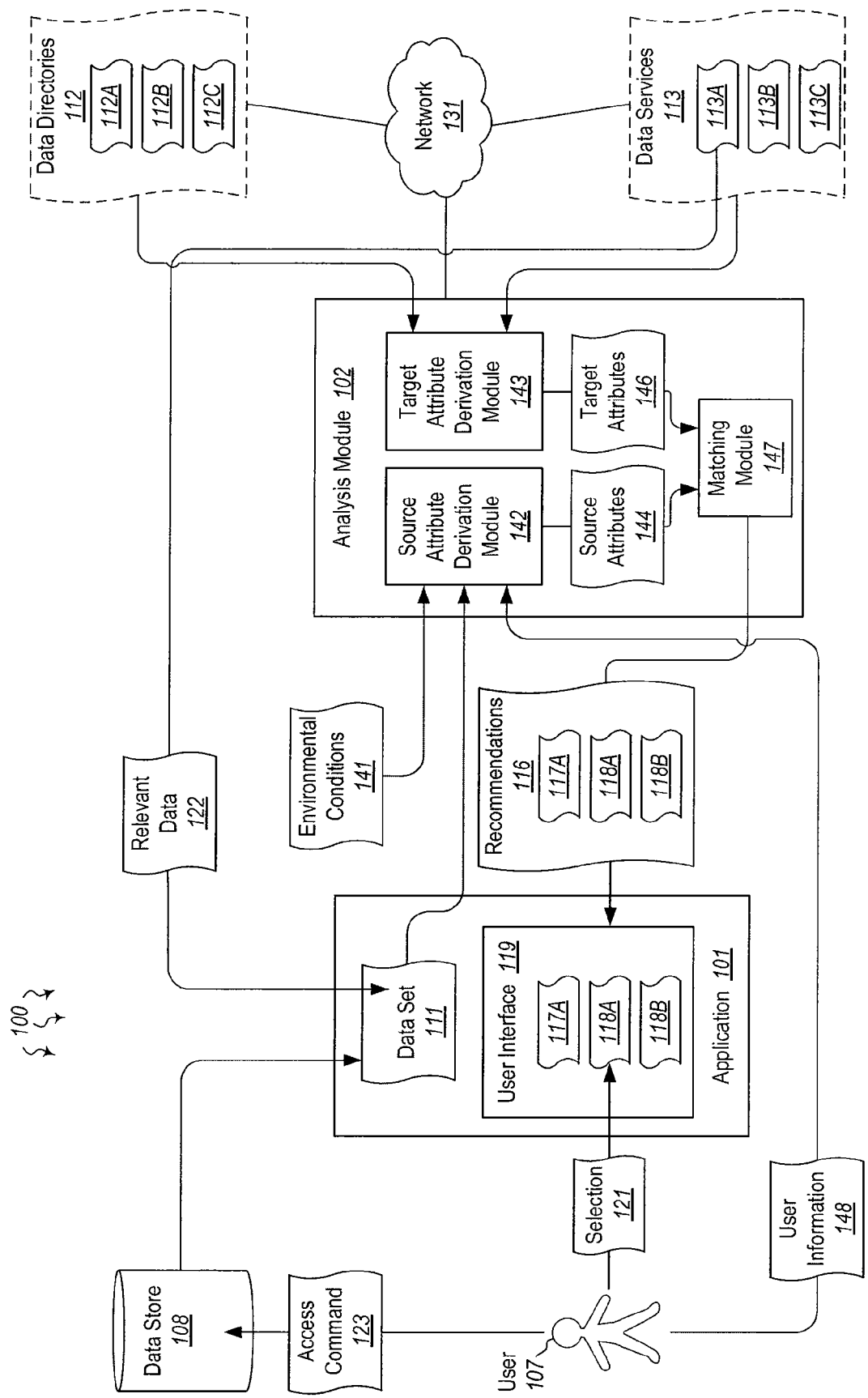
FIG. 1 illustrates an example computer architecture that facilitates recommending data based on user and data attributes.

The present invention extends to methods, systems, and computer program products for recommending data based on user and data attributes. It is detected that a user has accessed a dataset within a data processing application. Source attributes are derived for the accessed dataset. The source attributes are derived from one or more of: user information for the user and data information for the data.

Target attributes are identified for one or more sets of target data and/or one or more target data services. The derived source attributes are used along with identified target attributes for at least one of the sets of target data and/or at least one of the target data services to determine the desirability of the at least one of the sets of target data and/or at least one of the target data services as a source of relevant data. At least one set of target data and/or at least one target data service is recommended to the user as capable of providing relevant data. The relevant data having been found to be useful to other users working on data similar to the accessed dataset.

Embodiments of the present invention may comprise or utilize a special purpose or general-purpose computer including computer hardware, such as, for example, one or more processors, system memory, and a display, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include using identified attributes of a current user, and source data or both to propose relevant target data and data services to the user. Attributes of the target data or data services are also used. Target data and data services are recommended. Target data and data services can be like those that have been found useful to users like the current user working data like the source data. Accordingly, a user can be provided relevant data and/or data services without having to actively search. In addition, usage recommendations for target data and/or data services can be provided.

FIG. 1 illustrates an example computer architecture 100 that facilitates recommending data based on user and data. Referring to FIG. 1, computer architecture 100 includes application 101, analysis module 102, data store 108, data directories 112, and data services 113. Each of the components is connected to one another over (or is part of) a network, such as, for example, a Local Area Network ("LAN"), a Wide Area Network ("WAN"), and even the Internet, such as, for example, network 131. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 131.

Application 101 includes user interface 119. Application 101 can be virtually any data processing application such as, for example, a spreadsheet application, a database application, a word processor, etc. User 107 can interact with user interface 119 to submit input to application 101 and observe output from application 101. User 107 can interact with user interface 119 to load datasets into application 101 and manipulate data contained in datasets loaded into application 101. User interface 119 can be presented on a display device.

Data directories 112 and data services 113 can be internal or external to an organization (e.g., corporation) user 107 is associated with.

Generally, analysis module 102 is configured to analyze users and data and match source attributes to target attributes to identify recommended data. Analysis module 102 can operate as a (e.g., automated) background process. As such, analysis module 102 can have little, if any, performance impact on other processing within computer architecture 100 (e.g., at application 101). Analysis module 102 includes source attribute derivation module 142, target attribute derivation module 143, and matching module 147.

Source attribute derivation module 142 is configured to derive source attributes from one or more of: source data set information, user information, and environmental conditions (e.g., of an operating system, a task being performed, etc). Target attribute derivation module 143 is configured to derive target attributes from data in data directories 112 and available through data services 113. Matching module 147 can match source attributes to target attributes to identify data directories and/or data services that can provide data extending the value of a source dataset.

Analysis module 102 can implement an implement any of a variety of different mechanisms when recommending data. In some embodiments, analysis module 102 implements statistical algorithms to translate from a higher-dimensional attribute space to a lower-dimensional space (aka 'trait space'). A translation from a higher-dimensional attribute to a lower-dimensional attribute space can be used to generate source attributes. In these embodiments, analysis module learns of an expected rating for each combination of values in the trait space.

Alternately or in combination, analysis module 102 can utilize a secondary rule-based algorithm. The secondary rule-based algorithm can operate over both the higher-dimensional attribute space and the lower-dimensional space. The secondary rule-based algorithm can fix-up recommendations proposed by the statistical algorithm. Fixing-up a recommendation can include adding, removing, or adjusting recommendations. The secondary rule-based algorithm allows for editorial recommendations, in addition to statistical ones.

The secondary-rule based algorithm operates by processing an expression of a condition tree over the attributes and evaluating down to a boolean value of whether or not it should fire. Recommendations can have rank that allows them to be combined across systems. Recommendations can be fixed up to rescale the recommendations based on how recommendations from the statistical algorithm have performed.

Figure 2:
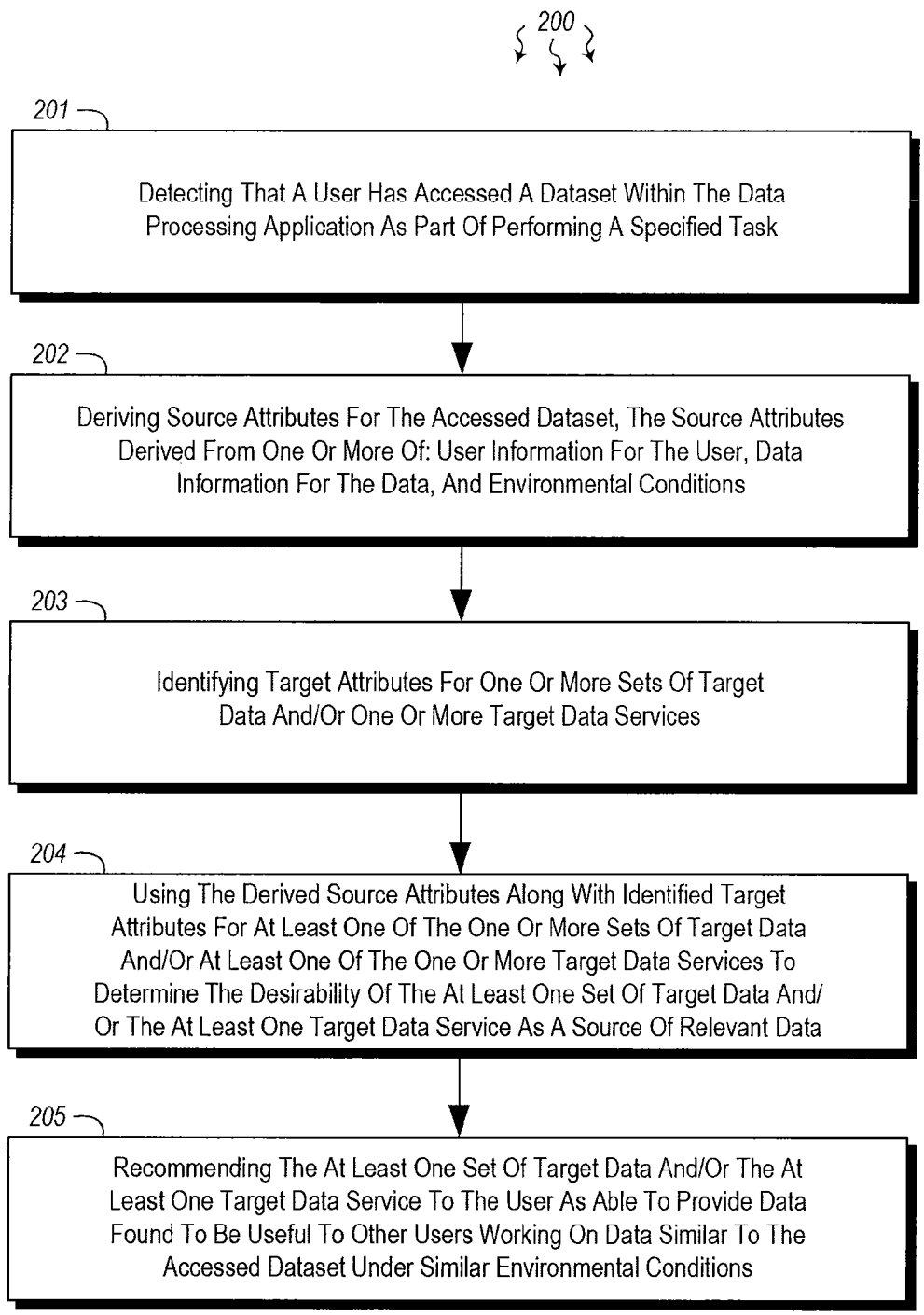
FIG. 2 illustrates a flow chart of an example method for recommending data based on user and data attributes.

FIG. 2 illustrates a flow chart of an example method 200 for recommending data based on user and data attributes. Method 200 will be described with respect to the components and data of computer architecture 100.

Method 200 includes an act of detecting that a user has accessed a dataset within the data processing application as part of performing a specified task (act 201). For example, application 101 can detect that user 107 has accessed data set 111 within application 101 as part of a task (e.g., adding data to a customer or product spreadsheet). User 107 can send access command 123 (possibly through user interface 119) to data store 108 to load data 111 in application 101.

Method 200 includes an act of deriving source attributes for the accessed dataset, the source attributes derived from one or more of: user information for the user, data information for the data, and environmental conditions (act 202). For example, source attribute derivation module 142 can derive source attributes 144 (for dataset 111) from one or more of: user information 148, data set 111, and environmental conditions 141 (e.g., conditions of an operation system, conditions of the specified task, etc.). Method 200 includes an act of identifying target attributes for one or more sets of target data and/or one or more target data services (act 203). For example, target attribute derivation 143 can identify target attributes 146 for data in data directories 112A, 112B, 112C, etc. and data available at data services 113A, 113B, 113C, etc.

Method 200 includes an act of using the derived source attributes along with identified target attributes for at least one of the one or more sets of target data and/or at least one of the one or more target data services to determine the desirability of the at least one of the one or more sets of target data and/or the at least one of the one or more target data services as a source of relevant data (act 204). For example, matching module 147 use source attributes 144 and identified attributes 146 for at least one of data directories 112 and/or for at least one of data services 113 to determine the desirability of at least one of data directories 112 and/or at least one of data services 113 as a source of data relevant to data set 111. In some embodiments, matching module 147 at least partially matches source attributes 114 to target attributes 146.

Method 200 includes an act of recommending the at least one set of target data and/or the at least one target data service to the user as able to provide data found to be useful to other users working on data similar to the accessed dataset under similar environmental conditions (act 205). For example, matching module 147 can send recommendations 116 to user interface 119. Recommendations 116 include recommendations 117A, 118A, and 118B corresponding to data directory 112A and data services 113A and 113B respectively. Each recommendation can indicate how the data directory and/or data service is relevant to data set 111. Recommending a data directory or data service can include using statistical and/or rule-based algorithms. Recommendation 116 can also indicate how recommend data directors and/or data services can be used to integrate data into the data set 111. For example, recommendation 116 can indicate that two columns of data provided by a data directory or data service are to be joined for inclusion in data set 111.

User 107 can subsequently select one or more recommendations presented at user interface 119. For example, user 107 can submit selection 121 to user interface 119 to select recommendation 118A. User interface 119 can receive selection 121. In response to the selection of recommendation 118A, analysis module 102 can transfer relevant data 122 from data service 113A into data set 111. Accordingly, relevant data 1122 can be used within application 101 without user 107 have to leave application 101.

In some embodiments, user attributes are collected and periodically updated based on inferences over user behavior and express marking by the user. For example, analysis module 102 can collect and periodically update user attributes for user 107 based on inferences over the behavior of user 107 and/or express marking by user 107.

Data set attributes can be collected through a pipeline. The pipeline can be based on one or more of: raw data (or data view), a set of characteristic samples or aggregations of the data (collectively referred to as sampled data), attributes identified by examining the sampled data. In general it may be that sets of data are meant to be used together (like sheets in an excel file). Thus, analysis is run on each portion of data in the data set. Data set attributes are identified over the portions (e.g., columns, tables and table sets.) The data set attributes are fed to an analysis module (e.g., analysis module 102) that processes these attributes and proposes recommendations of data and data services.

In some embodiments, a user can use an accessed data set directly against recommended data. In other embodiments, recommended data is converted to facilitate direct use. A conversion module (not shown) can consider one or more of: data type, semantic meaning, data format, and domain coverage when converting recommended data for direct use.

For example, there may be two columns (e.g., in a spreadsheet) of real-valued numbers (type), which represent a location (semantic meaning) in latitude and longitude (format) over south-eastern Canada (domain coverage). A high-interest and high-quality data source can align directly with these and it could be simply proposed to join with the columns that have the right attributes. Conversions can be chained to allow unexpected but valuable data for the user. For example, given the IP address logs of your mobile application, IP addresses can be converted into location information. The location information can subsequently be translated into demographic information and social media sentiment related to your mobile application.

Based on the granularity of portions of a dataset (e.g., columns of a spreadsheet), the distribution of the data within the portions of data of the dataset, and the associated semantics, a transformation pipeline can be constructed to facilitate direct used of a data source with minimum degradation of data. Granularity can be used to mitigate data loss—demographics by country are less valuable than demographics by postal code. Domain coverage can be used to estimate join production—even if zip code is more selective, if the dataset has almost no overlap in zip code data, but has complete overlap in country data it may be better to uses country data. Accordingly, by scoring a pipeline by granularity and/or join production a minimal loss of information can be achieved through a series of transformations to use the dataset or data service.

Data services can be treated as data sets themselves, where the data analyzed is the expected schema and a sampling of values over the supported data. Output can be treated as part of an accessed data set (e.g., when a table aligns row-by-row), additions to an accessed data set (e.g., when the data aligns with columns but represents new rows, or as a new data source (e.g., when there is neither row-by-row alignment, nor columnar alignment).

As such, embodiments of the invention include periodically (and possibly automatically) accessing and updating user information and accessed data sets. Source attributes are derived from user information and accessed data sets. Target attributes are derived from data directories and data services. Source attributes are compared to target attributes. When source attributes for an accessed data set match target attributes for a data directory or data service, the data directory or data service can be recommended to a user as having data relevant to the accessed data set. Accordingly, relevant data can be recommended to a user without the user having to expressly search for the relevant data or even know that the relevant data exists.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors, a method for recommending data related to a dataset used within a data processing application, the method comprising:
   detecting that a user has accessed a dataset within the data processing application as part of performing a specified task;
   deriving one or more source attributes relevant to the accessed dataset, the source attributes derived from one or more of user information for the user, and data information for the dataset;
   identifying one or more target attributes relevant to one or more sets of target data directories or one or more target data services, the one or more sets of target data directories and the one or more target data services being separate from the accessed dataset;
   matching the one or more source attributes relevant to the accessed dataset with the one or more target attributes relevant to the one or more sets of target data directories or the one or more target data services, to determine the desirability of at least one of the one or more sets of target data directories or at least one of the one or more target data services as a source of relevant data for being incorporated into the accessed dataset, wherein matching the one or more source attributes with the one or more target attributes comprises submitting the one or more source attributes to a statistical system based on translation from a high-dimensional attribute space to a lower dimensional space; and
   recommending the at least one set of target data directories or the at least one target data service to the user, as able to be incorporated into the accessed dataset.

2. The method as recited in claim 1, wherein deriving one or more source attributes relevant to the accessed dataset comprises deriving source attributes from raw data included in the accessed dataset.

3. The method as recited in claim 1, wherein deriving one or more source attributes relevant to the accessed dataset comprises deriving source attributes from a set of aggregations of the accessed dataset.

4. The method as recited in claim 1, wherein deriving one or more source attributes relevant to the accessed dataset comprises deriving source attributes from one or more columns of the accessed dataset.

5. The method as recited in claim 1, wherein deriving one or more source attributes relevant to the accessed dataset comprises deriving source attributes from expressly entered user information.

6. The method as recited in claim 1, wherein deriving one or more source attributes relevant to the accessed dataset comprises deriving source attributes from extrapolated user information.

7. The method as recited in claim 1, wherein deriving one or more source attributes relevant to the accessed dataset comprises deriving source attributes from one or more of the user interface being used and the task being performed.

8. The method as recited in claim 1, wherein matching the one or more source attributes with the one or more target attributes also comprises:
   learning the expected rating of each combination in the lower dimensional space.

9. The method as recited in claim 8, further comprising:
   submitting the expected rating of each combination in the lower dimensional space to a rule-based system; and
   the rule based system operating over the one or more source attributes and the one or more target attributes to fix recommendations proposed by the statistical system, including one or more of adding recommendations, removing recommendations, and adjusting recommendations.

10. The method as recited in claim 9, wherein the rule based system operating over the one or more source attributes and the one or more target attributes to fix recommendations proposed by the statistical system comprises adding editorial recommendations to recommendations from the statistical system.

11. The method as recited in claim 1, wherein matching the one or more source attributes with the one or more target attributes comprises identifying the at least one of the one or more sets of target data directories or the at least one of the one or more data services based on one or more of: data type, semantic meaning, format, and domain coverage.

12. The method as recited in claim 1, further comprising indicating to the user how the recommended at least one set of target data directories or the recommended at least one data service can be used to integrate data into the accessed dataset.

13. The method as recited in claim 12, wherein indicating to the user how the recommended at least one set of target data directories or the at least one data service can be used to integrate data into the accessed dataset comprises indicating that two columns of data provided by the at least one set of target data directories or the at least one data service are to be joined for inclusion in the accessed dataset.

14. The method as recited in claim 1, wherein recommending the at least one set of target data directories or the at least one target data service to the user comprises indicating how the at least one set of target data directories or the at least one target data service is relevant to the dataset.

15. The method as recited in claim 1, wherein recommending the at least one set of target data directories or the at least one target data service to the user comprises indicating how the at least one set of target data directories or the at least one target data service can be used to integrate data into the dataset.

16. A computer program product for use at a computer system, the computer system including a display device, the computer program product for implementing a method for recommending data related to a dataset used within a data processing application, the computer program product comprising one or more hardware storage devices having stored thereon computer-executable instructions that, when executed by a processor, cause the computer system to perform the method, including the following:
    detect that a user has accessed a dataset within the data processing application as part of performing a specified task;
    derive one or more source attributes relevant to the accessed dataset, the source attributes derived from one or more of user information for the user and data information for the dataset;
    identify one or more target attributes relevant to one or more sets of target data directories or one or more target data services, the one or more sets of target data directories and the one or more target data services being separate from the accessed dataset;
    matching the one or more source attributes relevant to the accessed dataset with the one or more target attributes relevant to the one or more sets of target data directories or the one or more target data services, to determine the desirability of at least one of the one or more sets of target data directories or at least one of the one or more target data services as a source of relevant data for being incorporated into the accessed dataset, wherein matching the one or more source attributes with the one or more target attributes comprises submitting the one or more source attributes to a statistical system based on translation from a high-dimensional attribute space to a lower dimensional space; and
    recommend the at least one set of target data directories or the at least one target data service to the user, as able to be incorporated into the accessed dataset.

17. The computer program product as recited in claim 16, wherein computer-executable instructions that, when executed, cause the computer system to match the one or more source attributes with the one or more target attributes comprise computer-executable instructions that, when executed, also cause the computer system to:
    learn the expected rating of each combination in the lower dimensional space.

18. The computer program product as recited in claim 17, further comprising computer-executable instructions that, when executed, cause the computer system to:
    submit the expected rating of each combination in the lower dimensional space to a rule-based system; and
    operate over the one or more source attributes and the one or more target attributes to fix recommendations proposed by the statistical system, including one or more of adding recommendations, removing recommendations, and adjusting recommendations.

19. The computer program product as recited in claim 18, wherein computer-executable instructions that, when executed, cause the computer system to operate over the one or more source attributes and the one or more target attributes to fix recommendations proposed by the statistical system comprise computer-executable instructions that, when executed, cause the computer system to add editorial recommendations to recommendations from the statistical system.

20. The computer program product as recited in claim 16, further comprising computer-executable instructions that, when executed, cause the computer system to indicate to the user how the recommended at least one set of target data directories or the recommended at least one data service can be used to integrate data into the accessed dataset.

21. The computer program product as recited in claim 20, wherein computer-executable instructions that, when executed, cause the computer system to indicate to the user how the recommended at least one set of target data directories or the at least one data service can be used to integrate data into the accessed dataset comprise computer-executable instructions that, when executed, cause the computer system to indicate that two columns of data provided by the at least one set of target data directories or the at least one data service are to be joined for inclusion in the accessed dataset.

22. A computer system including:
    one or more hardware processors; and
    one or more computer-readable media having stored thereon computer-executable instructions that, when executed by the one or more processors, cause the computer system to recommend data related to a dataset used within a data processing application, including the following:
        detecting that the user has accessed a dataset within a data processing application as part of performing a specified task;
        deriving one or more source attributes relevant to the accessed dataset, the source attributes derived from one or more of the accessed user information, the accessed dataset, and environmental conditions associated with the data processing application;
        identifying one or more target attributes relevant to one or more sets of target data directories or one or more target data services, the one or more sets of target data directories and the one or more target data services being separate from the accessed dataset;
        matching the one or more source attributes relevant to the accessed dataset with the one or more target attributes relevant to one or more sets of target data directories or at least one of the one or more target data services, to determine the desirability of at least one of the one or more sets of target data directories or at least one of the one or more target data services as a source of relevant data for being incorporated into the accessed dataset, wherein matching the one or more source attributes with the one or more target attributes comprises submitting the one or more source attributes to a statistical system based on translation from a high-dimensional attribute space to a lower dimensional space; and
        recommending the at least one set of target data directories or the at least one target data service to the user, as able to be incorporated into the accessed dataset.

* * * * *